(12) United States Patent
Sowa et al.

(10) Patent No.: US 7,051,931 B2
(45) Date of Patent: May 30, 2006

(54) CHIP CARD READER

(75) Inventors: Jochem Sowa, Moorenweis (DE);
Wolfgang Neifer, Freising (DE)

(73) Assignee: SCM Microsystems GmbH, Ismaning (DE)

( * ) Notice: Subject to any disclaimer, the term of this patent is extended or adjusted under 35 U.S.C. 154(b) by 28 days.

(21) Appl. No.: 10/350,126

(22) Filed: Jan. 24, 2003

(65) Prior Publication Data

US 2003/0141365 A1    Jul. 31, 2003

(30) Foreign Application Priority Data

Jan. 28, 2002   (DE) .......................... 202 01 237 U

(51) Int. Cl.
*G06K 7/06* (2006.01)
*G06K 19/06* (2006.01)

(52) U.S. Cl. ...................... 235/441; 235/492

(58) Field of Classification Search ................ 235/441, 235/486, 492, 479, 439; 710/301; 361/737, 361/743–745
See application file for complete search history.

(56) References Cited

U.S. PATENT DOCUMENTS

| 5,397,857 A | | 3/1995 | Farquhar et al. | |
|---|---|---|---|---|
| 5,877,488 A | * | 3/1999 | Klatt et al. | ................ 235/486 |
| 5,995,722 A | * | 11/1999 | Kishida | ..................... 358/1.15 |
| RE36,540 E | * | 2/2000 | Farquhar et al. | ........... 156/73.1 |
| 6,108,209 A | * | 8/2000 | Cox et al. | ................... 361/737 |
| 6,142,793 A | * | 11/2000 | Schremmer et al. | ....... 439/76.1 |
| 6,272,017 B1 | * | 8/2001 | Klatt et al. | ................. 361/737 |
| 6,307,753 B1 | * | 10/2001 | Baginy et al. | ............. 361/796 |
| 6,313,400 B1 | * | 11/2001 | Mosquera et al. | ........ 174/35 R |
| 6,315,205 B1 | * | 11/2001 | Bates, III | ................... 235/479 |
| 6,353,870 B1 | * | 3/2002 | Mills et al. | ................. 710/301 |
| 6,666,382 B1 | * | 12/2003 | Lisimaque et al. | ........ 235/492 |

FOREIGN PATENT DOCUMENTS

| DE | 43 10 517 A1 | 10/1994 |
|---|---|---|
| DE | 694 11 218 T 2 | 10/1994 |
| DE | 694 12 425 T2 | 5/1995 |
| DE | 296 01 265 U1 | 8/1996 |
| DE | 199 47 162 C1 | 9/2000 |
| EP | 0 735 507 A2 | 10/1996 |
| EP | 1 059 600 A2 | 12/2000 |
| GB | 2 306 789 A | 5/1997 |
| WO | WO 97/38443 | 10/1997 |

\* cited by examiner

*Primary Examiner*—Thien M. Le
*Assistant Examiner*—April Taylor
(74) *Attorney, Agent, or Firm*—Finnegan, Henderson, Farabow, Garrett & Dunner, L.L.P.

(57) ABSTRACT

A chip card reader is disclosed having a plug-in-socket, an insertion slot for a chip card, and a housing according to a PCMCIA format. The housing includes a base plate and a cover plate extending between the plug-in socket and the insertion slot. The base plate and the cover plate include a plastic part and a metallic part and the metallic part of the base plate is directly welded to the metallic part of the cover plate.

32 Claims, 3 Drawing Sheets

сhip # CHIP CARD READER

BACKGROUND OF THE INVENTION

The present invention relates to a chip card reader, in particular to a chip card reader comprising a housing according to a PCMCIA format, the housing including a base plate and a cover plate extending between a plug-in socket and an insertion slot for a chip card.

Chip card readers of this kind are known from the prior art, for example from EP 0 735 507 A3. They are used as interfaces between a host device like a computer or a set-top-box and a chip card. Chip card readers are used in a large variety of applications and, accordingly, there is a high demand for low-priced but reliable chip card readers in the electronic market. Common chip card reader designs feature housings which are made of sheet metal, mainly for the sake of sufficient mechanical stability and temperature resistance.

SUMMARY OF THE INVENTION

It is the object of the invention to provide a chip card reader comprising a housing which is inexpensive and light in weight and yet satisfies high requirements in mechanical strength.

The chip card reader according to the invention comprises a housing according to a PCMCIA format. The housing includes a base plate and a cover plate extending between a plug-in socket and an insertion slot for a chip card. The base plate and the cover plate are each made of a plastic part and a metallic part and are assembled by interconnecting the metallic parts of both plates. It has been found that a housing of a chip card reader which is mainly composed of plastic parts and only particular components being made of metal can meet the high demands on mechanical strength. By interconnecting the metallic parts of the base and the cover plates sufficient stability of the housing is ensured. Due to the plastic parts the housing according to the invention is not as susceptible to plastic deformation as conventional metal housings. Moreover, the housing according to the invention has also shown to satisfy the common requirements in temperature resistance.

The base plate and/or the cover plate are preferably produced by a molding process in which the metallic part is inserted into a casting mold and molded around with plastic.

In a preferred embodiment of the invention the metallic parts of the base and cover plates are exposed along lateral edges of both plates. The metallic part of at least one of the base and cover plates has at least one bent side strip, the structure of the chip card reader enabling an assembly technique according to which the side strip is directly welded to the opposing exposed lateral edge of the other plate.

According to a particular aspect of the invention a printed circuit board with a chip card contacting unit and an intermediate plate are arranged between the base plate and the cover plate. The intermediate plate protects the printed circuit board from unintended damage upon insertion of a chip card.

To ease the insertion of a chip card having embossed (elevated) areas one of the cover and base plates has an internal card guiding structure comprising a pair of parallel guide bars. The guide bars extend along opposite longitudinal edges of the plate and have exposed guiding surfaces defining a common plane. The insertion slot has a narrow portion and a widened portion, the widened portion being defined by a stepped interior surface area of the plate. One of the guide bars has an end with a ramp face extending between the stepped surface area and the exposed guiding surface, allowing a continuous smooth gliding of the chip card into the accomodation channel of the chip card reader.

According to another aspect of the invention the housing of the chip card reader is provided with a physical coding matching with a corresponding physical coding of a printed circuit board. Thus, inadvertent installation of a wrong printed circuit board can be avoided.

BRIEF DESCRIPTION OF THE DRAWINGS

Further details of the invention become apparent from the following description of the invention and from the enclosed drawings. In the drawings.

DETAILED DESCRIPTION

Figure 1:
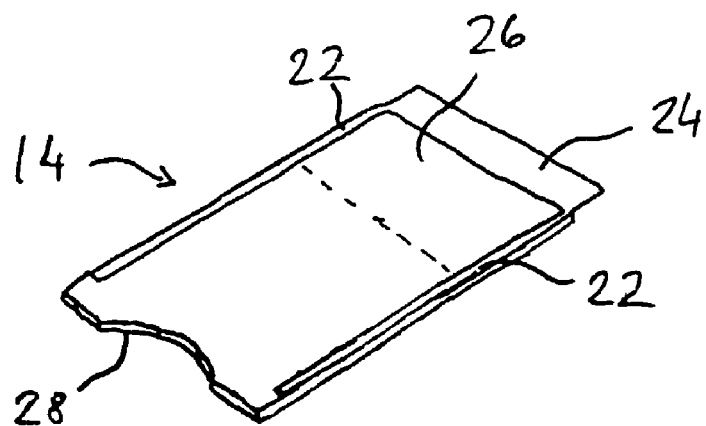
FIG. 1 is an exploded view of a chip card reader.
Figure 1:
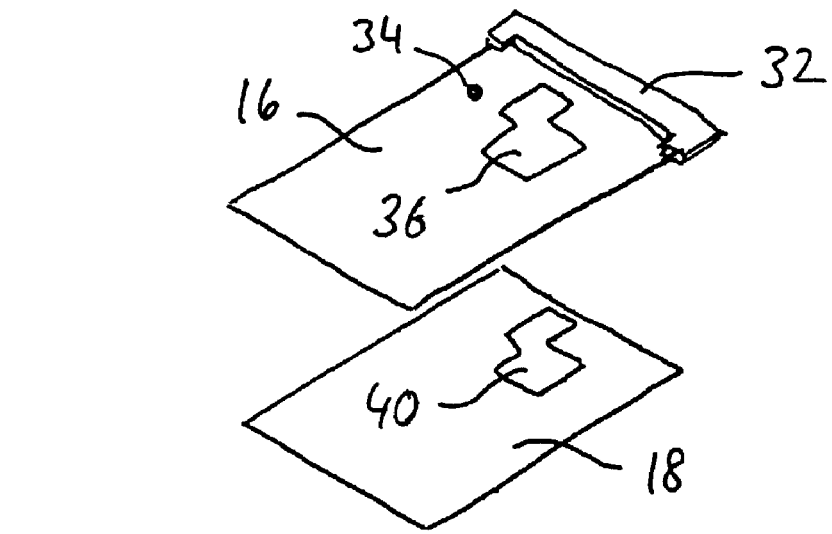
Figure 1:
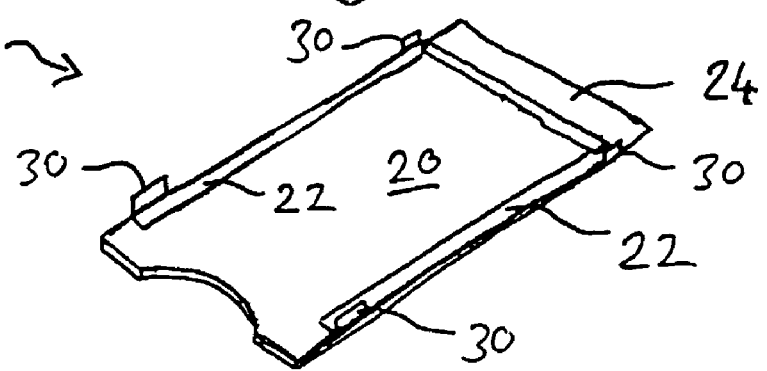

The chip card reader 10 illustrated in FIG. 1 is composed of a base plate 12 and a cover plate 14; a printed circuit board 16 and an intermediate plate 18 are arranged between the base plate 12 and the cover plate 14.

The base plate 12 is configured of a main plastic part 20 and a metallic part, preferably a sheet metal part. The base plate 12 is preferably produced by a molding process in which a suitable metallic part is inserted into a particular casting mold and molded around with plastic. After the molding process only lateral portions 22 of the metal part extending along the longitudinal edges of the base plate 12 and an end piece 24 are exposed. The remaining portions of the metal part are surrounded by the main plastic part 20 of the base plate 12.

Figure 2:
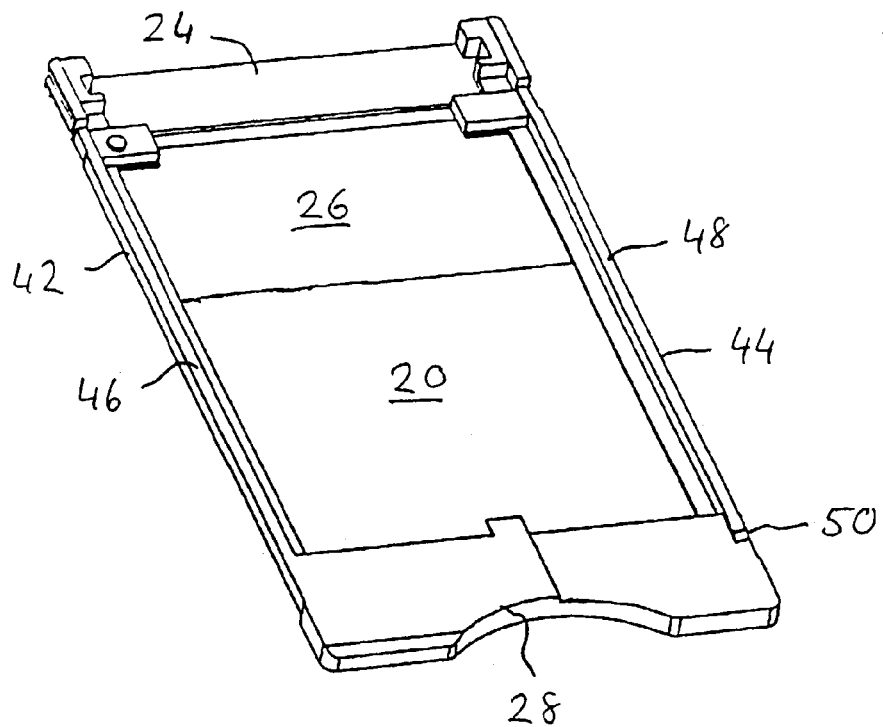
FIG. 2 is a perspective view of the interior side of a cover plate of a chip card reader.

The cover plate 14 is generally produced and configured similar to the base plate 12. However, as can be seen in FIG. 2, an interior portion of the cover plate 14 adjacent the end piece 24 is not covered with plastic. Thus, the interior surface of the cover plate 14 has a plastic portion and a metallic portion 26. In this particular case the metallic portion 26 extends over the entire width of the cover plate 14. The corresponding exterior surface of portion 26 may be blank metal or plastic covered. The end of the main plastic part 20 opposite of the end piece 24 is formed as a chip card receiving portion 28. The chip card receiving portion 28 of the cover plate 14 may differ from the corresponding portion of the base plate 12 (as will be explained below).

The metallic part of the base plate 12 has bent up side strips 30 protruding from both lateral portions 22. The side strips 30 are located next to the chip card receiving portion 28 and next to the end piece 24. The metallic part of the cover plate 14 may have corresponding side strips 30 so that the base plate 12 and the cover plate 14 can be interconnected in a conventional manner by welding to each other the bent side strips 30 of both plates 12, 14. However, in the embodiment shown in FIG. 1 only the metallic part of the base plate 12 has side strips 30 while the cover plate 14 lacks such strips. To interconnect the base plate 12 and the cover plate 14 the side strips 30 of the metallic part of base plate 12 are directly welded to the metallic lateral portions 22 of the cover plate.

Figure 3A:
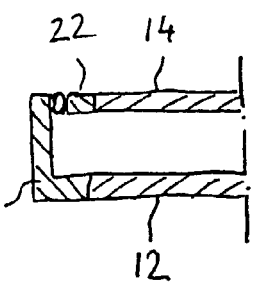
FIGS. 3*a*, 3*b* are sectional detail views of welded base and cover plate portions near the plug-in socket and near the chip card receiving portion, respectively.
Figure 3B:
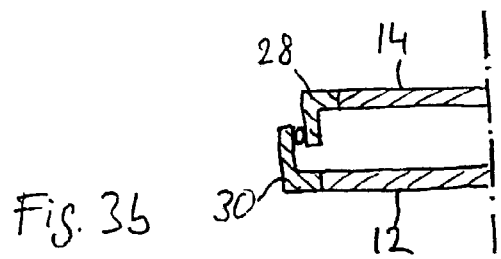

In FIGS. 3a and 3b connection points between a base plate 12 and a cover plate 14 are schematically illustrated in detail. According to the embodiment shown in FIG. 3a both the base plate 12 and the cover plate 14 have side strips 30 near the end piece 24 (not shown in FIG. 3a) which are welded to each other. In this context it has to be noted that the width of a standard chip card is 54 mm. Considering that in the region adjacent the end piece 24 a chip card reader must not exceed an overall width of 54 mm to fit into a standard PCMCIA slot of a host device, there would be no room for any side strips next to the chip card. However, since even a completely inserted chip card does not reach into this region of the chip card reader 10 according to the invention, the interior width can be less than 54 mm, allowing the provision of side strips 30 on both the base and the cover plate 12, 14, respectively, as shown in FIG. 3a.

In the region near the chip card receiving portion 28 the overall width of the chip card reader 10 may be slightly larger than the width of a 54 mm standard smart card on the one hand, but on the other hand, unlike in the region adjacent the end piece 24, an inserted chip card is present in this region. Therefore, the effective room for providing any side strips is less than in the region near the end piece 24. In order to still achieve a satisfactory connection between the base plate 12 and the cover plate 14 and to provide a lateral guidance means for the chip card, according to FIG. 3b only the base plate 12 is provided with side strips 30 near the chip card receiving portion 28 which are directly welded to an opposing edge of the metallic lateral portion 22 of the cover plate 14.

Returning to the illustration of FIG. 1, the printed circuit board 16 is equipped with a plug-in socket 32 attached to one of its longitudinal ends and providing electrical connection between the chip card reader 10 and a host device into which the chip card reader 10 is inserted. A grounding clip 34 facing the interior surface of the cover plate 14 is provided on the printed circuit board 16. The grounding clip 34 contacts the metallic portion 26 of the interior surface of the cover plate 14. The size and shape of the contacted metallic portion 26 of the cover plate 14, especially the dimension in the chip card insertion direction, may be adjusted to solve ECM problems. The printed circuit board 16 further holds a chip card contacting unit 36 with contacting elements facing downwards (according to the illustration of FIG. 1) to contact the contact field of a chip card (not shown in FIG. 1).

An intermediate plate 18 of similar size and shape like the printed circuit board 16 is provided between the base plate 12 and the printed circuit board 16. The intermediate plate 18 is preferably made of plastic and covers the conductor track side of the printed circuit board 16 facing towards the base plate 12. However, the intermediate plate 18 has a cut-out portion 40 corresponding to the contacting unit 36 of the printed circuit board 16 in position and shape. The intermediate plate 18 may have further cut-out portions or recesses corresponding to embossed (elevated) areas of particular types of chip cards.

In the assembled state the printed circuit board 16 and the intermediate plate 18 are mounted between the base plate 12 and the cover plate 14. Both end pieces 24 of the base and cover plates 12, 14 cover the plug-in-socket 32 attached to the printed circuit board 16. An accomodation channel for a chip card is formed between the base plate 12 and the intermediate plate 18 which protects the downward facing conductor track side of the printed circuit board 16. The chip card receiving portion 28 opposite the end piece 24 of the cover plate 14 together with the corresponding part of the base plate 12 forms an insertion slot for a chip card.

When a chip card is inserted into the accomodation channel of the chip card reader 10 possible damage to the printed circuit board 16 due to tilting of the chip card 38 is prevented by the protective intermediate plate 18. The chip card 38 is supported by two parallel guide bars 42, 44 extending along opposite longitudinal edges of the cover plate 14 (see FIG. 3). After complete insertion of the chip card 38 the downward facing contact elements of the contacting unit 36, which protrude through the cut-out portion 40 of the intermediate plate 18, are in contact with the upward facing contact field of the chip card 38.

Figure 4:
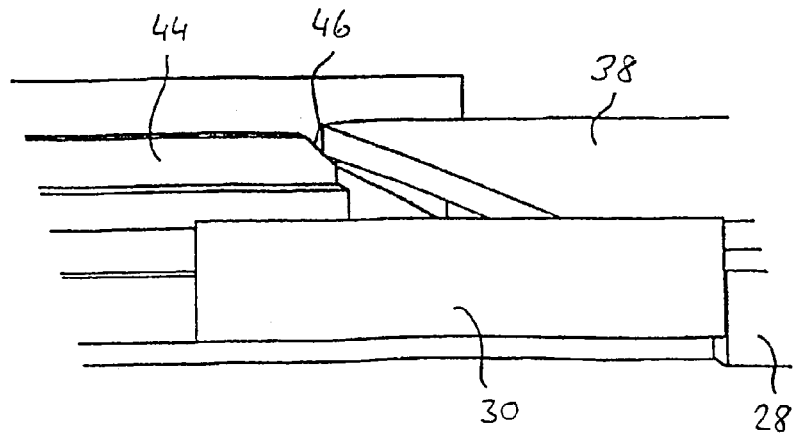
FIG. 4 is a perspective detail view of a part of a cover plate and a chip card.

FIG. 4 shows an example of a cover plate 14 to be used in a chip card reader according to the invention. The parallel guide bars 42, 44 provided on the cover plate 14 extend from the chip card receiving portion 28 to the area next to the end piece 24. The guide bars 42, 44 have exposed guiding surfaces 46, 48 defining a common plane. The chip card receiving portion 28 of the cover plate 14 has a stepped surface area. One of the guide bars 44 has an end with a ramp face 50 extending between the stepped surface area and the exposed guiding surface 48. The stepped surface area of the chip card receiving portion 28 of the cover plate 14 together with the flat surface area of the corresponding portion of the base plate 12 define an insertion slot having a narrow portion and a widened portion.

The internal card guiding structure described above is particularly useful when chip cards with embossed areas are inserted into the chip card reader 10. According to the illustration of FIG. 2 such chip card is inserted into the insertion slot with the embossed areas on the right half of the chip card facing downwards. Since both the narrow and the widened portion of the insertion slot have to be wider than the thickness of the flat and of the embossed areas of the chip card, respectively, it cannot be excluded that upon insertion the chip card is tilted clockwise out of the common plane defined by the exposed guiding surfaces 46, 48 of the guide bars 42, 44. To avoid a possible jamming of the chip card in the insertion slot, the ramp face 50 provided at the end of guide bar 44 ensures that upon further insertion into the accomodation channel the chip card 38 is lifted upwards onto the guiding surface 48 of guide bar 44 as can be seen in FIG. 4.

It has to be understood that referring to the plates 12 and 14 of the housing as "base" plate and "cover" plate, respectively, is not limiting to the orientation of the chip card reader 10. Base plate 12 and cover plate 14 can also be interchanged. Moreover, the chip card receiving portion 28 with the stepped surface area can alternatively be formed on the base plate 12.

Figure 5A:
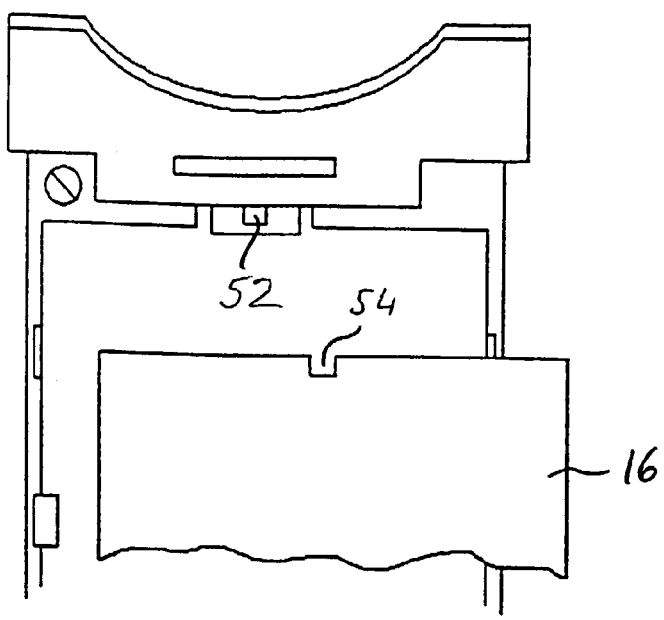
FIG. 5*a* is a plan view of part of a vertically open chip card reader with a coding for a printed circuit board.
Figure 5B:
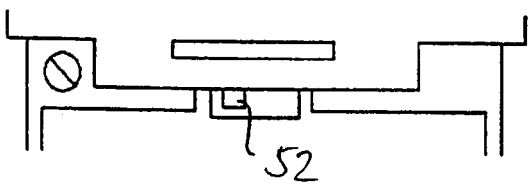
FIGS. 5*b*–5*e* are details of the chip card reader of FIG. 4*a* with different codings.
Figure 5C:
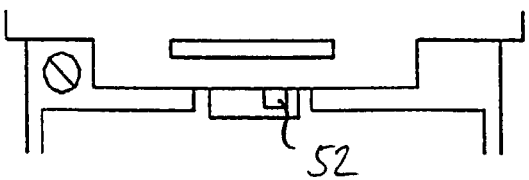
Figure 5D:
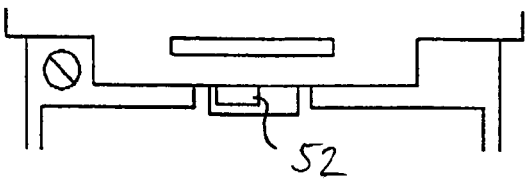
Figure 5E:
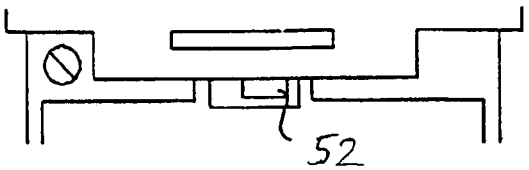

FIG. 5a depicts a chip card reader 10 with a printed circuit board 16 to be inserted into the housing. The housing is provided with a projection 52 positioned at a particular predetermined location. In the embodiment shown in FIG. 5a the projection 52 is formed behind the chip card receiving portion 28 facing the printed circuit board 16. The printed circuit board 16 has a corresponding recess 54 matching with the projection 52 of the housing. Accordingly, other printed circuit boards having smaller or elsewhere located recesses or no recesses at all cannot be installed into this particular type of housing. By this coding systems misinstallation of printed circuit boards can be avoided.

FIGS. 5b to 5e show different codings, i.e. the individual projections 52 of the housings vary in position and size. Only printed circuit boards having the matching recesses 54 can be installed. For example, the printed circuit board 16 shown in FIG. 5a cannot be installed into any of the housings shown in FIGS. 5b to 5e.

Such coding system may be used with regard to the operating voltage of the chip card reader 10. For example, one particular matching projection/recess pair can be associated to an operation voltage of 5 Volt, which is the standard voltage according to a current PCMCIA standard, and another particular pair can be associated to an operation voltage of 3.3 Volt according to a future standard. In this case the above described coding system would prevent malfunction of or damage to components on an erraneously installed printed circuit board 16 due to a discrepancy between the supplied voltage and the proper operation voltage of the printed circuit board 16.

It has to be understood that any suitable physical coding system may be used for this purpose, especially the projection 52 of the housing and the recess 54 of the printed circuit board 16 may be interchanged, i.e. the projection 52 can be provided on the printed circuit board 16 while the recess 54 is provided in the housing.

The invention claimed is:

1. A chip card reader, comprising:
   a plug-in-socket;
   an insertion slot for a chip card; and
   a housing according to a PCMCIA format, the housing including:
      a base plate and a cover plate extending between the plug-in socket and the insertion slot, and
      wherein the base plate and the cover plate include a plastic part and a metallic part and the metallic part of the base plate is directly welded to the metallic part of the cover plate,
      wherein at least one of the base plate and cover plate is formed by inserting the metallic part in a casting mold and the plastic part is molded around the metallic part.

2. The chip card reader according to claim 1, wherein the metallic part of the base plate and cover plate is exposed along lateral edges of both plates.

3. The chip card reader according to claim 2, wherein the metallic part of at least one of the base plate and the cover plate includes at least one bent side strip directly welded to an opposing exposed lateral edge of an opposing plate.

4. The chip card reader according to claim 1, wherein the metallic part of the base plate and the cover plate includes exposed end pieces covering the plug-in socket.

5. The chip card reader according to claim 1, wherein at least one of the base plate and cover plate includes:
   an internal card guiding structure comprising a pair of parallel guide bars extending along opposite longitudinal edges of the plate and having exposed guiding surfaces defining a common plane, and wherein the insertion slot for the chip card includes a narrow portion and a wide portion, the wide portion being defined by a stepped interior surface area of the plate, and one of the guide bars having an end with a ramp face extending between the stepped surface area and the exposed guiding surface.

6. The chip card reader according to claim 1, further comprising:
   a matching pair of codings associated to a particular operating voltage of the chip card reader.

7. A chip card reader, comprising:
   a plug-in-socket;
   an insertion slot for a chip card; and
   a housing according to a PCMCIA format, the housing including:
      a base plate and a cover plate extending between the plug-in socket and the insertion slot, wherein the base plate and the cover plate include a plastic part and a metallic part and the metallic part of the base plate is directly welded to the metallic part of the cover plate, and
      a printed circuit board arranged between the base plate and the cover plate, the printed circuit board including a grounding clip which is in contact with at least one of the metallic part of the base plate and cover plate in an assembled state for the chip card reader.

8. The chip card reader according to claim 7, wherein the grounding clip contacts an interior metal surface portion of at least one of the base plate and the cover plate.

9. The chip card reader according to claim 7, wherein the printed circuit board further includes a chip card contacting unit comprising contacting elements, and wherein the chip card reader further comprises an intermediate plate arranged between the base plate and the cover plate.

10. The chip card reader according to claim 9, wherein the intermediate plate and the printed circuit board are of similar size and shape.

11. The chip card reader according to claim 9, wherein the intermediate plate includes plastic.

12. The chip card reader according to claim 9, wherein the intermediate plate covers a side of the printed circuit board from which the contacting elements of the chip card contacting unit protrude.

13. The chip card reader according to claim 9, further comprising:
    an accommodation channel for the chip card, the accommodation channel being formed between the intermediate plate and at least one of the base plate and cover plate.

14. The chip card reader according to claim 9, wherein the intermediate plate includes a cut-out portion through which the contacting elements of the chip card contacting unit protrude.

15. The chip card reader according to claim 7, wherein the housing is provided with a physical coding matching with a corresponding physical coding of the printed circuit board.

16. The chip card reader according to claim 15, wherein the housing is provided with a projection or a recess matching with a corresponding recess or projection, respectively, of the printed circuit board.

17. A chip card reader, comprising:
    a housing according to a PCMCIA format, the housing including:
       a base plate and a cover plate to define an insertion slot for receiving a chip card, and wherein the base plate and the cover plate include a plastic part and a metallic part and at least one of the metallic parts of the base plate and cover plate include protrusions used to connect the metallic part of the base plate with the metallic part of the cover plate,
       wherein the plastic part of at least one of the base plate and cover plate is molded around the metallic part of the respective cover plate and base plate; and
    a plug-in-socket connected with an end of the housing.

18. The chip card reader of claim 17, wherein the metallic part is exposed along lateral edges of at least one of the base plate and cover plate.

19. The chip card reader of claim 17, wherein the metallic part of at least one of the base plate and cover plate includes at least one bent side strip directly welded to an opposing exposed lateral edge of an opposing plate.

20. The chip card reader of claim 17, wherein the metallic part of the base plate and the cover plate includes exposed end pieces covering the plug-in socket.

21. The chip card reader of claim 17, wherein at least one of the base plate and cover plate includes:
an internal card guiding structure comprising a pair of parallel guide bars extending along opposite longitudinal edges of the plate and having exposed guiding surfaces defining a common plane, and wherein the insertion slot for the chip card includes a narrow portion and a wide portion, the wide portion being defined by a stepped interior surface area of the plate, and one of the guide bars having an end with a ramp face extending between the stepped surface area and the exposed guiding surface.

22. The chip card reader of claim 21, wherein the housing is provided with a projection or a recess matching with a corresponding recess or projection, respectively, of the printed circuit board.

23. The chips card reader of claim 17, further comprising:
a matching pair of codings associated to a particular operating voltage of the chip card reader.

24. A chip card reader, comprising:
a housing according to a PCMCIA format, the housing including;
a base plate and a cover plate to define an insertion slot for receiving a chip card, and wherein the base plate and the cover plate include a plastic part and a metallic part and at least one of the metallic parts of the base plate and cover plate include protrusions used to connect the metallic part of the base plate with the metallic part of the cover plate, and
a printed circuit board arranged between the base plate and the cover plate, the printed circuit board including a grounding clip which is in contact with at least one of the metallic part of the base plate and cover plate in an assembled state for the chip card reader
a plug-in-socket connected with an end of the housing.

25. The chip card reader of claim 24, wherein the grounding clip contacts an interior metal surface portion of at least one of the base plate and the cover plate.

26. The chip card reader of claim 24, wherein the printed circuit board further includes a chip card contacting unit comprising contacting elements, and wherein the chip card reader further comprises an intermediate plate arranged between the base plate and the cover plate.

27. The chip card reader of claim 26, wherein the intermediate plate and the printed circuit board are of similar size and shape.

28. The chip card reader of claim 27, wherein the intermediate plate includes plastic.

29. The chip card reader of claim 26, wherein the intermediate plate covers a side of the printed circuit board from which the contacting elements of the chip card contacting unit protrude.

30. The chip card reader of claim 26, further comprising:
an accommodation channel for the chip card, the accommodation channel being formed between the intermediate plate and at least one of the base plate and cover plate.

31. The chip card reader of claim 26, wherein the intermediate plate includes a cut-out portion through which the contacting elements of the chip card contacting unit protrude.

32. The chip card reader of claim 26, wherein the housing is provided with a physical coding matching with a corresponding physical coding of the printed circuit board.

* * * * *